UNITED STATES PATENT OFFICE 2,579,709

GLASS COMPOSITION

John J. Smith, Tarentum, James Earle Duncan, Brackenridge, and Harry A. Truby, New Kensington, Pa., assignors to Pittsburgh Plate Glass Company, Allegheny County, Pa., a corporation of Pennsylvania No Drawing. Application September 22, 1948, Serial No. 50,652

3 Claims. (Cl. 106—53)

The present invention relates to glass compositions and more particularly to a glass composition which enables the production of a glass possessing the physical properties of a so-called lead glass although containing in itself a proportion of lead oxide considerably below that present in the ordinary lead glass.

It is well recognized that lead glasses are particularly suited for special applications because of their high indices of refraction, low melting points, and relative freedom from surface devitrification. The presence of lead oxide in the glass, however, occasions some difficulty in grinding and polishing or otherwise surfacing the final glass. Ordinarily, this disadvantage is of minor importance and is ignored in favor of the other desirable physical properties of the glass itself. Nevertheless, in some cases it is necessary to finish carefully and to close tolerances lead glasses, thus making consideration of this problem vital.

It is one object of our invention to provide a lead glass which possesses the desirable properties of commercial lead glasses and which at the same time, is more readily produced and worked.

We have found that a glass composition containing less than half the customary amount of lead oxide can be given the physical properties normally connected with a high lead oxide content glass by a careful adjustment of the proportions of the remaining constituents of the glass together with inclusion therein of approximately 1% of fluorine.

The following compositions are typical of glasses which we have prepared in accordance with our invention.

Examples

| Ingredient | Per Cent by Weight | | |
|---|---|---|---|
| | 1 | 2 | 3 |
| $SiO_2$ | 66.95 | 69.37 | 66.96 |
| $Na_2O$ | 14.74 | 15.61 | 14.76 |
| $PbO$ | 13.48 | 10.02 | 14.48 |
| $Al_2O_3$ | 2.88 | 2.99 | 2.28 |
| $F_2$ | .96 | .99 | .96 |
| $Sb_2O_3$ | .99 | 1.02 | None |
| $CeO_2$ | None | None | .56 |

These glasses are clear, substantially colorless and plates thereof are readily ground and polished. The glass will have a thermal coefficient of linear expansion of $8.9 \pm .2 \times 10^{-6}$ per degrees centigrade between 25° C. and 300° C. and a maximum softening point of 645° C. These glasses also possess good chemical stability as evidenced by their freedom from opalescence and surface devitrification.

In general, potassium and lithium oxides may be substituted for a part of the sodium oxide without affecting the physical properties of the finished glass. Care must be taken in this respect, however, for an excess of potassium oxide over sodium oxide in the final batch will result in a glass having a softening point somewhat higher than the 645° C. of the described glasses.

Arsenic oxide may be used in place of antimony oxide to assist in fining the glass during melting thereof. Similarly, small amount of other metallic oxides, such as cerium oxide (batch #3), titanium oxide, aluminum oxide, zinc oxide, or zirconium oxide may be incorporated in the glass to alter the color thereof or to change various transmission factors. Usually these additions are made in lieu of the antimony oxide and in amounts varying from 0.5 to 1.5 percent by weight.

The fluorine is incorporated in the glass as a fluorine salt, sodium fluoride or cryolite. Inasmuch as a portion of the fluorine may be vaporized during the melting operation, it is desirable that an excess of the fluorine salt be included in the batch in order that the final composition will include the proper concentration of fluorine.

What we claim is:

1. A clear lead glass having a thermal coefficient of linear expansion of $8.9 \pm 0.2 \times 10^{-6}$ per degree centigrade between 25° C. and 300° C. and a maximum softening point of 645° C. comprising by weight from 66 to 70 percent of silicon dioxide, from 14.5 to 16 percent of alkali metal oxide, from 10 to 15 percent of lead oxide, from 2 to 3 percent of aluminum oxide, approximately 1 percent of fluorine and from about 0.5 to 1.5 percent of a modifying metal oxide selected from the group consisting of antimony oxide, cerium oxide, arsenic oxide, titanium oxide, zinc oxide and zirconium oxides.

2. A lead glass having a thermal coefficient of linear expansion of $8.9 \pm 0.2 \times 10^{-6}$ per degree centigrade between 25° C. and 300° C. and a maximum softening point of 645° C. comprising by weight approximately 67 percent of silicon dioxide; 15 percent of alkali metal oxide, 13.5 percent of lead oxide, 3 percent of aluminum oxide, 1 percent of fluorine and 1 percent of antimony oxide.

3. A lead glass having a thermal coefficient of linear expansion of $8.9 \pm 0.2 \times 10^{-6}$ per degree centigrade between 25° C. and 300° C. and a maximum softening point of 645° C. comprising by weight approximately 67 percent of silicon dioxide, 15 percent of sodium oxide, 14.5 percent of lead oxide, 2.3 percent of aluminum oxide, 1 percent of fluorine and 0.5 percent of cerium oxide.

JOHN J. SMITH.
JAMES EARLE DUNCAN.
HARRY A. TRUBY.

REFERENCES CITED

The following references are of record in the file of this patent:

UNITED STATES PATENTS

| Number | Name | Date |
|---|---|---|
| Re. 13,766 | Macbeth | July 7, 1914 |
| 1,721,979 | Taylor | July 23, 1929 |
| 2,230,199 | Dobrovolny | Jan. 28, 1941 |